US012372042B1

(12) United States Patent
Eller, III

(10) Patent No.: US 12,372,042 B1
(45) Date of Patent: Jul. 29, 2025

(54) ENGINE VALVE COVER ASSEMBLY

(71) Applicant: Royal Clyo Eller, III, Kannapolis, NC (US)

(72) Inventor: Royal Clyo Eller, III, Kannapolis, NC (US)

( * ) Notice: Subject to any disclaimer, the term of this patent is extended or adjusted under 35 U.S.C. 154(b) by 0 days.

(21) Appl. No.: 18/394,193

(22) Filed: Dec. 22, 2023

Related U.S. Application Data

(60) Provisional application No. 63/434,665, filed on Dec. 22, 2022.

(51) Int. Cl.
*F02F 1/24* (2006.01)
*F01M 11/04* (2006.01)
*F02F 11/00* (2006.01)

(52) U.S. Cl.
CPC ............... *F02F 1/24* (2013.01); *F01M 11/04* (2013.01); *F02F 11/002* (2013.01)

(58) Field of Classification Search
CPC ............ F02F 1/24; F02F 11/002; F01M 11/04
See application file for complete search history.

(56) References Cited

U.S. PATENT DOCUMENTS 7,051,695 B1 * 5/2006 Kowis ................... F16B 5/0266 411/536
7,765,970 B2 * 8/2010 Sammons ............... F02F 7/006 123/90.38
7,765,971 B1 * 8/2010 Overacker ............... F01M 9/10 123/193.5
8,141,531 B2 * 3/2012 Smith ..................... F02F 7/006 123/193.5
D812,644 S * 3/2018 Tomlinson ........................ D15/5
D818,503 S * 5/2018 Tomlinson ........................ D15/5
D823,897 S * 7/2018 Tomlinson ........................ D15/5
2005/0132997 A1 * 6/2005 Vargas ..................... F02F 7/006 123/195 C
2010/0043740 A1 * 2/2010 Turner, Jr. ............. F16M 1/026 123/196 AB
2010/0109258 A1 * 5/2010 Smith ..................... F02F 7/006 123/195 C

* cited by examiner

*Primary Examiner* — Sizo B Vilakazi
(74) *Attorney, Agent, or Firm* — Schwartz Law Firm, P.C.

(57) ABSTRACT

An engine valve cover assembly is adapted for mounting over a cylinder head of an internal combustion engine. The valve cover assembly includes a cover having a top wall and integrally formed side and end walls defining an open bottom. The top wall has an exposed outside surface and an opposing inside surface. A plurality of cover standoffs are adapted for mounting to a floor of the cylinder head, and have respective distal ends configured to engage the inside surface of the top wall. The distal end of each standoff and the inside surface of the top wall include complementary male and female formations configured to mate upon installation of the cover over the cylinder head. The mating formations cooperate to consistently and precisely align a bottom perimeter edge of the cover with a perimeter edge of the cylinder head.

20 Claims, 6 Drawing Sheets

ENGINE VALVE COVER ASSEMBLY

TECHNICAL FIELD AND BACKGROUND OF THE DISCLOSURE

The present disclosure relates broadly and generally to an engine valve cover assembly, method of manufacturing a valve cover assembly, and method of preventing oil leaks in an internal-combustion engine of a vehicle.

Engine valve covers (also known as “rocker covers” or “camshaft covers”) are commonly used with internal-combustion engines to enclose and protect the valvetrain components inside the cylinder head, including the valves, rocker arms, and camshaft. In addition to its functional roles, the valve cover is often designed with aesthetics in mind. It may have an aesthetically pleasing appearance and may even bear the manufacturer’s logo or other branding. Valve covers are commonly made of metal or plastic, depending on the engine design and materials used. Cracks and misalignment of the valve cover can cause oil to leak into the engine compartment which if left attended will ultimately lead to engine failure.

LS valve covers typically refer to those used on engines that belong to the GM LS (Gen III and Gen IV) engine family. The LS engine family is a series of V8 engines produced by General Motors and commonly found in various GM vehicles. The “LS” designation commonly refers to the engine architecture itself, and there are different variations of the LS engine, such as the LS1, LS2, LS3, LS6, LS7, and more. Each variant may have slightly different components, including valve covers, depending on the specific model and generation. Aftermarket parts, including valve covers, allow enthusiasts to customize the appearance of their LS engines while maintaining functionality and performance. In exemplary embodiments, the valve cover assembly of the present disclosure is especially applicable for use on LS engines.

SUMMARY OF EXEMPLARY EMBODIMENTS

Various exemplary embodiments of the present disclosure are described below. Use of the term “exemplary” means illustrative or by way of example only, and any reference herein to “the invention” is not intended to restrict or limit the invention to exact features or steps of any one or more of the exemplary embodiments disclosed in the present specification. References to “exemplary embodiment,” “one embodiment,” “an embodiment,” “various embodiments,” and the like, may indicate that the embodiment(s) of the invention so described may include a particular feature, structure, or characteristic, but not every embodiment necessarily includes the particular feature, structure, or characteristic. Further, repeated use of the phrase “in one embodiment,” or “in an exemplary embodiment,” do not necessarily refer to the same embodiment, although they may.

It is also noted that terms like “preferably”, “commonly”, and “typically” are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

According to one exemplary embodiment, the present disclosure comprises an engine valve cover assembly adapted for mounting over a cylinder head of an internal combustion engine. The valve cover assembly includes a cover having a top wall and integrally formed side and end walls defining an open bottom. The top wall has an exposed outside surface and an opposing inside surface. A plurality of cover standoffs are adapted for mounting to a floor of the cylinder head, and have respective distal ends configured to engage the inside surface of the top wall. The distal end of each standoff and the inside surface of the top wall include complementary male and female formations configured to mate upon installation of the cover over the cylinder head. The mating formations cooperate to consistently and precisely align a bottom perimeter edge of the cover with a perimeter edge of the cylinder head. When installed, the exemplary valve cover assembly creates a perfect seal without risk of misalignment and oil leaks.

According to another exemplary embodiment, the formations located on the inside of the cover comprise a plurality of bosses. The term “boss” refers broadly herein to any protruding feature or structure applicable for locating one object within a complementary pocket, recess or hole of another object.

According to another exemplary embodiment, the formation located at the distal end of each standoff comprises a counterbore.

According to another exemplary embodiment, the distal end of each standoff defines an internally-threaded fastener hole adjacent the counterbore. The term “counterbore” refers broadly herein to a pocket, recess, hole, socket or the like applicable for receiving a boss. In one embodiment, the counterbore comprises a cylindrical flat-bottomed hole that enlarges an adjacent coaxial hole.

According to another exemplary embodiment, a plurality of threaded (e.g., shoulder) bolts are inserted through respective fastener holes in said top wall of said cover, and are configured to be received into the internally-threaded fastener holes of the standoffs.

According to another exemplary embodiment, a plurality of O-rings are located between the threaded bolts and the cover at respective fastener holes formed in the top.

According to another exemplary embodiment, each standoff has a threaded connector located at a proximal end opposite the distal end. The threaded connector is configured to be received into a complementary-threaded opening in the floor of the cylinder head.

According to another exemplary embodiment, the top wall of the cover defines at least one opening for receiving an Army-Navy (AN) fitting.

According to another exemplary embodiment, the top wall of the cover defines an oil fill opening.

According to another exemplary embodiment, reinforcement ribbing is integrally formed with an interior of the cover.

According to another exemplary embodiment, the interior of the cover includes a plurality of rocker arm backcuts configured to accommodate actuation of rocker arms at the cylinder head of the internal combustion engine.

According to another exemplary embodiment, the interior of the cover includes a horizontal backcut configured to promote oil drainback to the cylinder head.

According to another exemplary embodiment, a valve cover gasket is located at the bottom perimeter edge of the cover. The exemplary gasket may be made of rubber, plastic, cork, or other suitable material having sufficient crush strength to effect a complete and proper seal.

In yet another embodiment, the present disclosure comprises an engine valve cover assembly adapted for mounting over a cylinder head of an internal combustion engine. The valve cover assembly includes a cover having a top wall and integrally formed side and end walls defining an open bottom. The top wall has an exposed outside surface and an opposing inside surface. A plurality of standoffs, each having a threaded connector located at its proximal end, are configured to be received into a complementary-threaded opening in the floor of the cylinder head. The distal end of each standoff defines a counterbore configured to mate with a complementary boss formed on the inside surface of the top wall upon installation of the cover over the cylinder head. The mating bosses and counterbores cooperate to consistently and precisely aligning a bottom perimeter edge of the cover with a perimeter edge of the cylinder head.

BRIEF DESCRIPTION OF THE DRAWINGS

Exemplary embodiments of the present disclosure will hereinafter be described in conjunction with the following drawing figures, wherein like numerals denote like elements, and wherein.

DESCRIPTION OF EXEMPLARY EMBODIMENTS AND BEST MODE

The present invention is described more fully hereinafter with reference to the accompanying drawings, in which one or more exemplary embodiments of the invention are shown. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article “a” is intended to include one or more items. Where only one item is intended, the term “one”, “single”, or similar language is used. When used herein to join a list of items, the term “or” denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
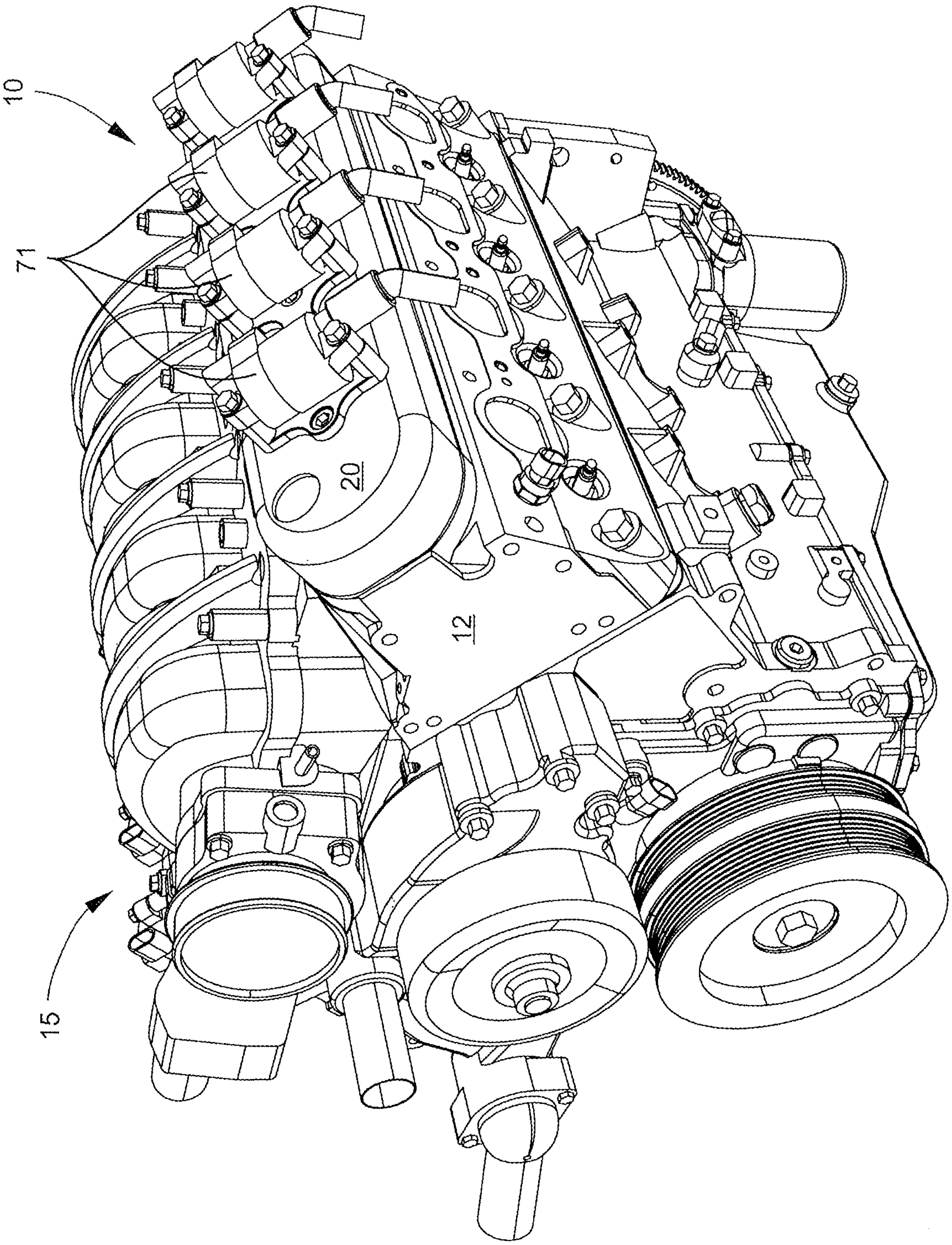
FIG. 1 is an environmental view showing the exemplary valve cover assembly mounted on a vehicle engine.
Figure 2:
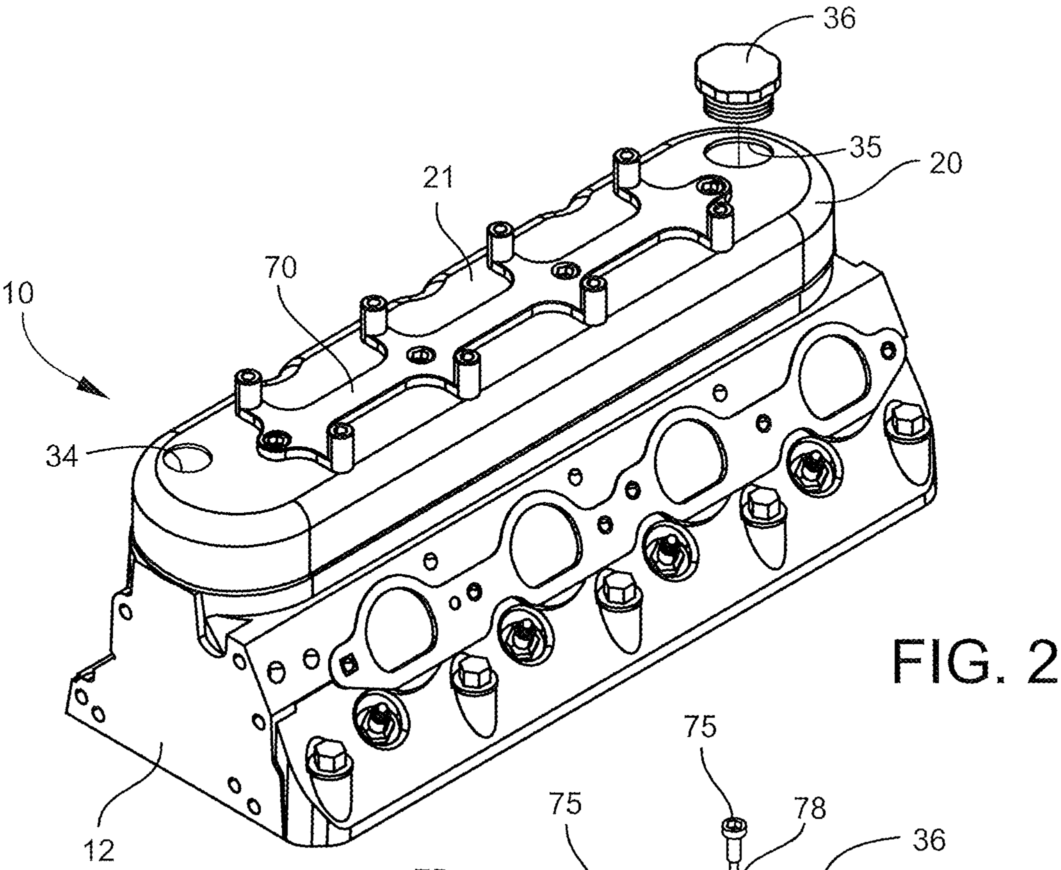
FIGS. 2 and 3 are perspective views showing various exemplary parts of the valve cover assembly exploded from the cover.
Figure 6:
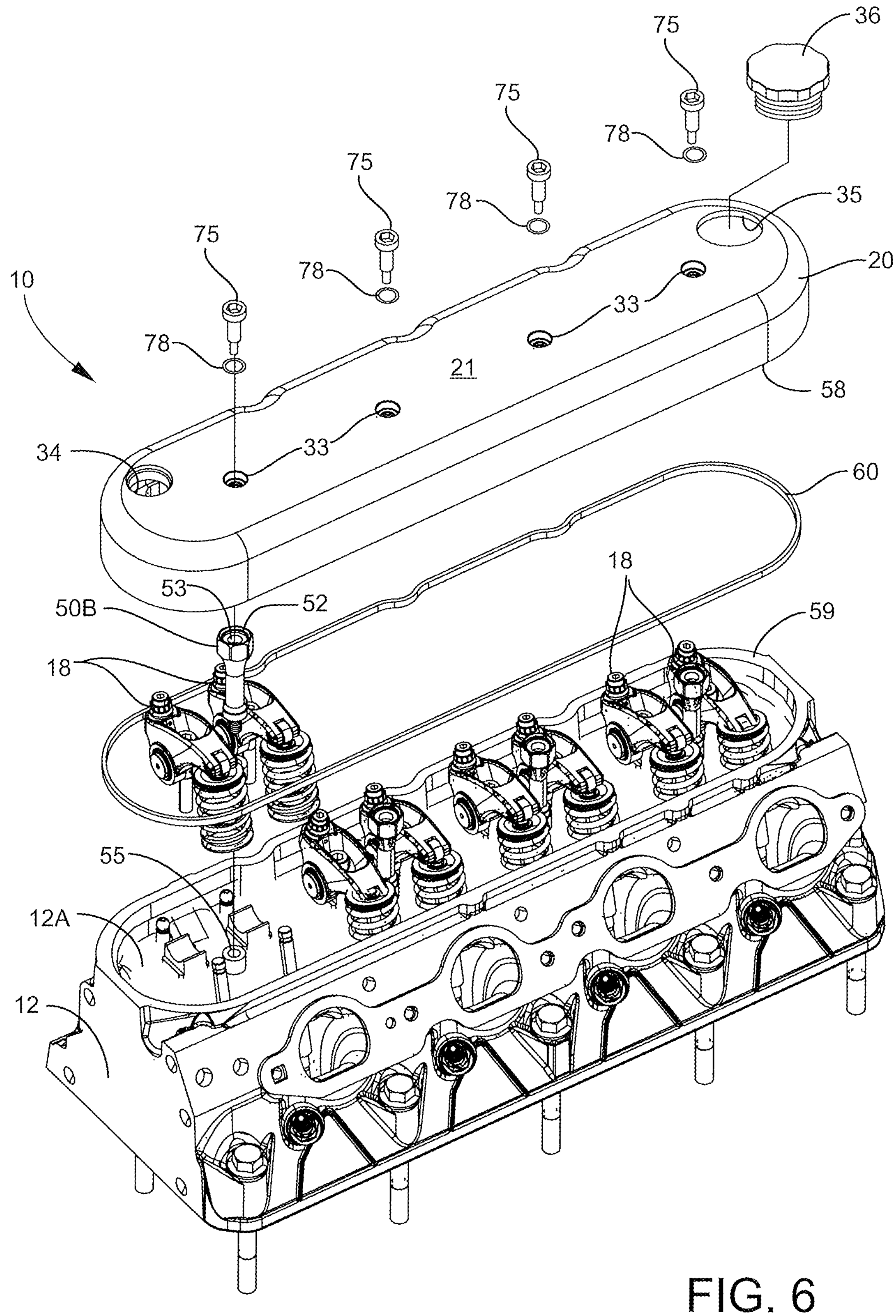
FIG. 6 is a further perspective view of the exemplary valve cover assembly exploded away from the cylinder block of the vehicle engine.
Figure 7:
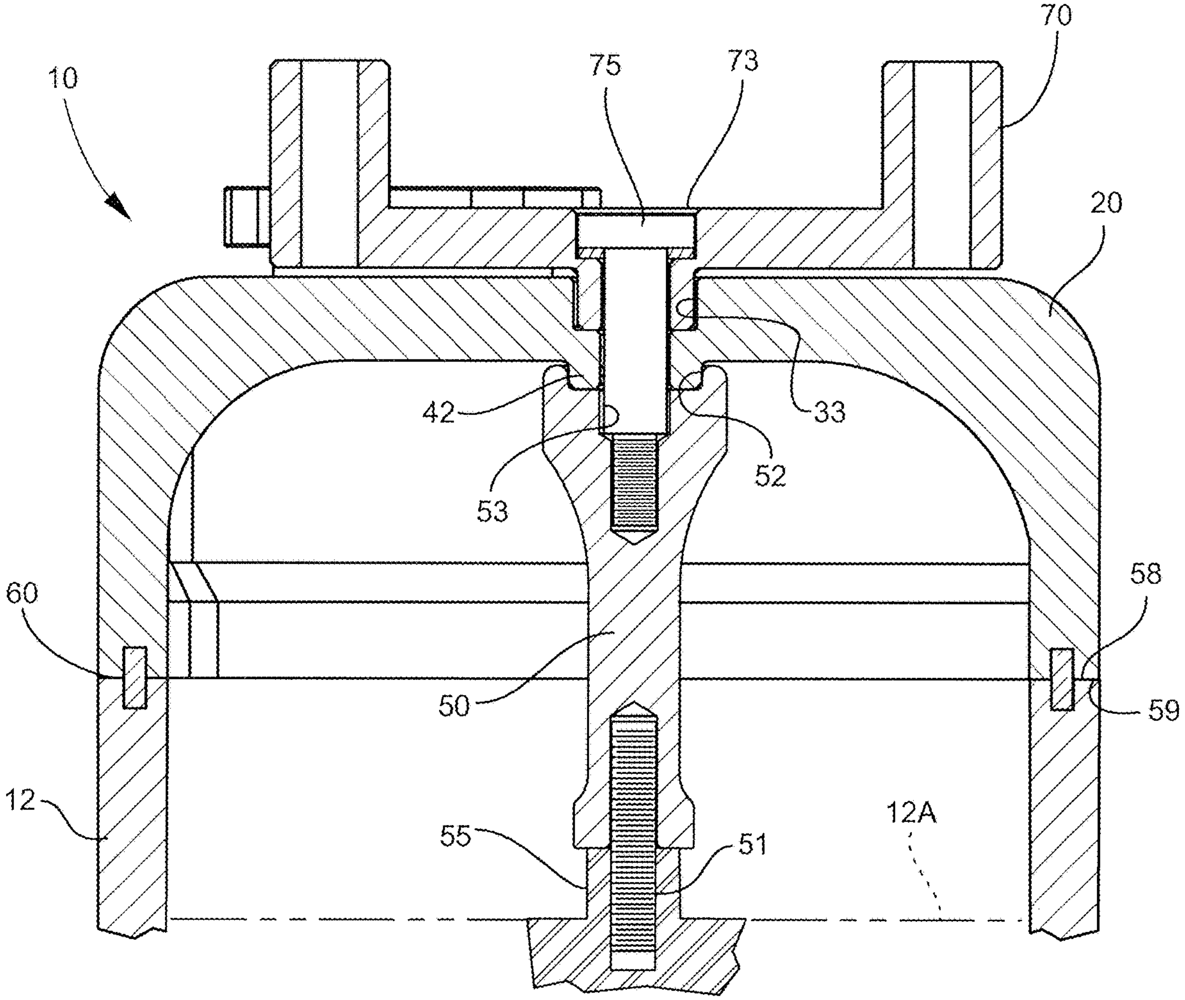
FIG. 7 is a fragmentary cross-sectional view showing the exemplary valve cover assembly installed on the cylinder block of the vehicle engine.

Referring now specifically to the drawings, an engine valve cover assembly according to one exemplary embodiment of the present disclosure is illustrated in FIGS. 1 and 2, and shown generally at broad reference numeral 10. The exemplary valve cover assembly 10 is adapted for mounting over a cylinder head 12 of an internal combustion engine 15, such as a conventional LS-based small-block V8 crate engine. Like other assemblies of the prior art, the valve cover assembly 10 covers the valvetrain components, including the rocker arms 18 (FIG. 6), and functions primarily to seal and protect these components from contaminants, and to facilitate oil filling and ventilation. The present valve cover assembly 10 precisely, consistently and securely locates on the cylinder head 12 to effect a complete and proper seal when installed. For V-type vehicle engines, separate valve cover assemblies 10 are mounted on each bank of cylinders.

Figure 3:
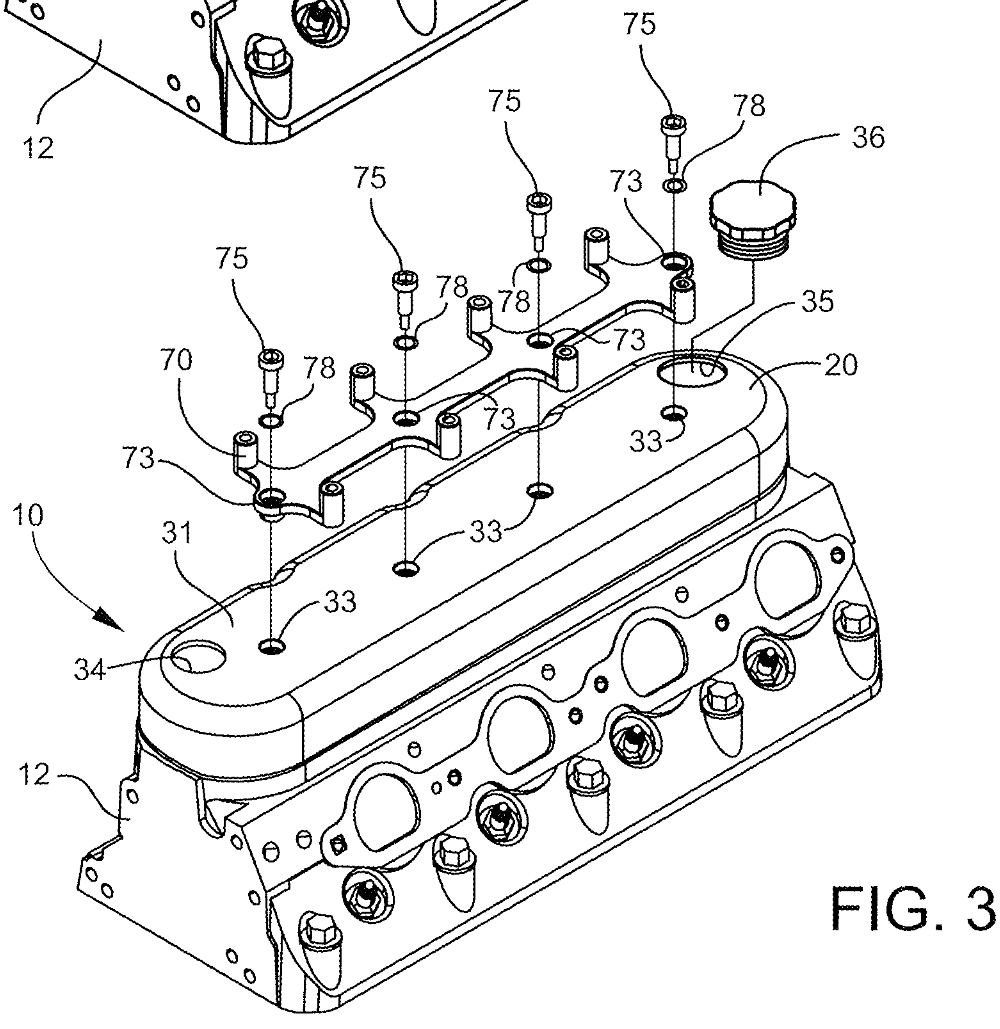
Figure 4:
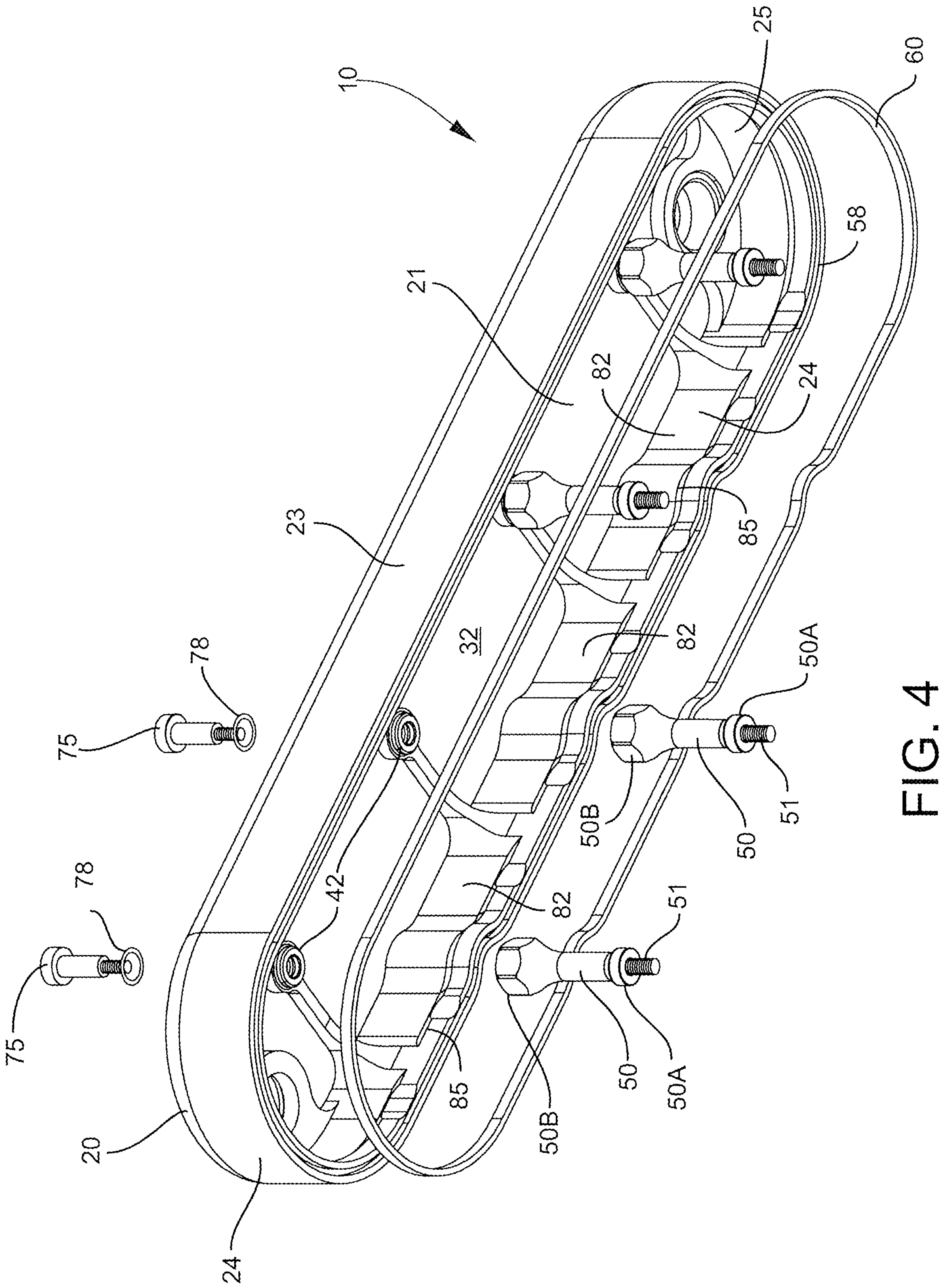
FIG. 4 is a further perspective view showing an underside of the exemplary valve cover assembly with the standoffs and shoulder bolts exploded from the cover.
Figure 5:
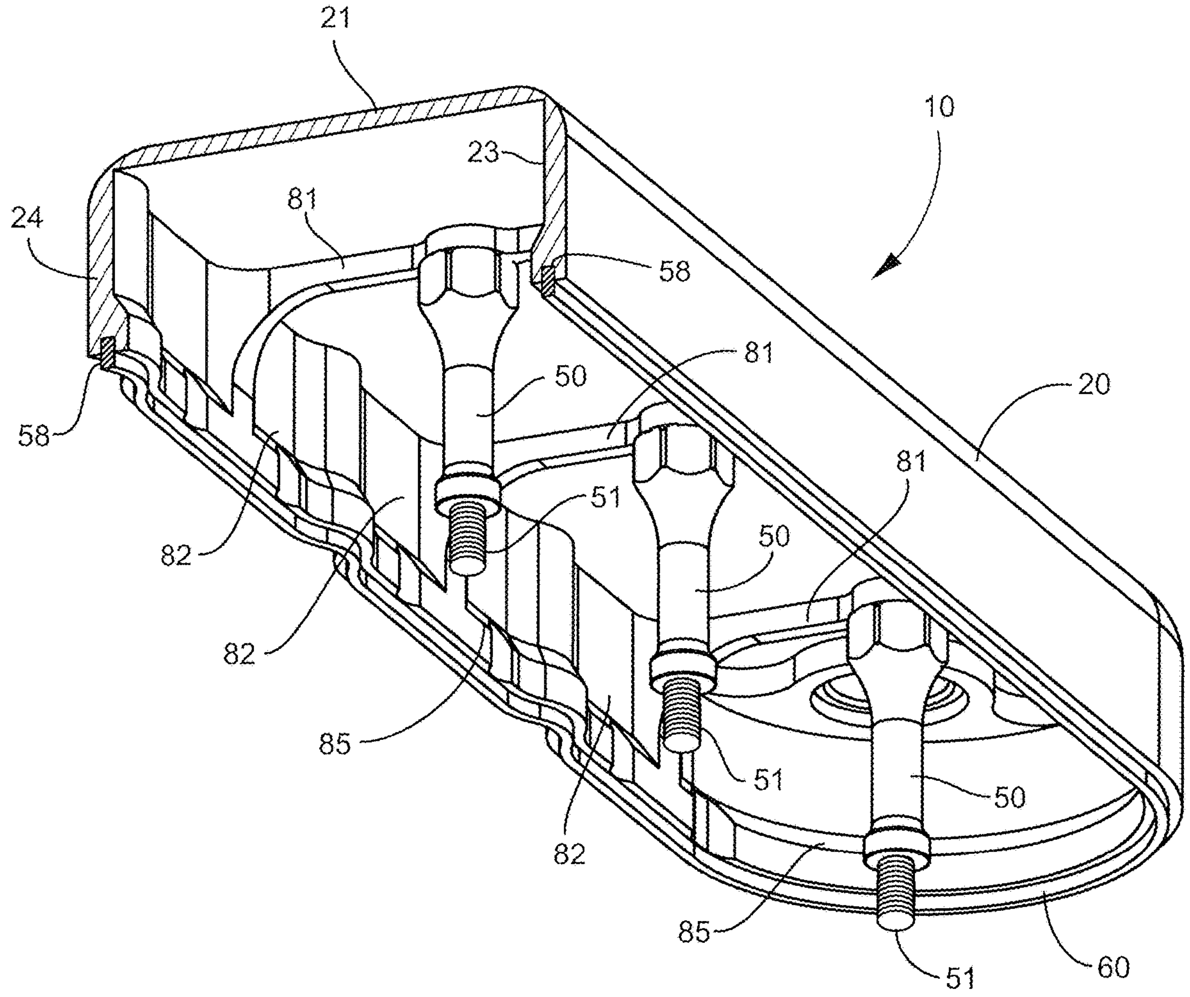
FIG. 5 is a cross-sectional view of the exemplary valve cover assembly.

Referring to FIGS. 3, 4 and 5, the exemplary valve cover assembly 10 comprises a metal cover 20 having a top wall 21, opposing side walls 22, 23 and opposing end walls 24, 25. The top, side and end walls 21-25 are integrally formed together (e.g, machined) and cooperate to define an open bottom. The top wall 21 has an exposed outside surface 31, an opposing inside surface 32, a number of spaced countersunk fastener holes 33, and openings 34, 35 for an oil fill cap 36 and AN fittings (not shown). AN fittings are utilized in conventional valve cover assemblies, and serve to removably connect intake breather and positive crankcase ventilation (PCV) hoses. Spaced apart cylindrical bosses 42 are integrally formed on the inside surface 32 of the top wall 21 at respective fastener holes 33.

As best shown in FIGS. 4-7, a plurality of cover standoffs 50 are designed for mounting to a floor 12A of the cylinder head 12 and engaging the inside surface 32 of the top wall 21. Each standoff 50 includes a threaded connector 51 located at its proximal end 50A and an enlarged distal 50B end defining a counterbore 52. The exemplary counterbore 52 comprises a cylindrical flat-bottomed hole that enlarges an adjacent coaxial fastener hole 53 with an internal screw thread. The standoff connector 51 is received into a complementary-threaded opening 55 in the floor 12A of the cylinder head 12, while the counterbore 52 at the distal end 50B is shaped to mate closely and precisely with a cylindrical boss 42 of the top wall 21. See FIG. 7. Upon installation of the cover assembly 10 over the cylinder head 12, the mating bosses 42 and standoff counterbores 52 cooperate to consistently and precisely align a bottom perimeter edge 58 of the cover 20 with a corresponding perimeter edge 59 of the cylinder head 12. A cover gasket 60 resides between the aligned perimeter edges 58, 59 when the valve cover assembly 10 is installed. The exemplary gasket 60 may be made of rubber, plastic, cork, or other material suitable for establishing a tight fit and seal between the engine 15 and valve cover assembly 10.

Referring again to FIGS. 1, 2 and 3, in one embodiment a coil bracket 70 is located on top of the valve cover 20 and functions hold and stabilize the ignition coils 71 within the engine compartment. The coil bracket 70 comprises fastener holes 73 spaced-apart to align with the fastener holes 33 formed in top wall 21. A number of threaded shoulder bolts 75 are inserted through the aligned fastener holes 73 and 33, and are configured to be received into respective internally-threaded fastener holes 53 of the standoffs 50. O-rings 78 are located between the shoulder bolts 75 and the cover 20—directly engaging the coil bracket 70 at respective fastener holes 73. The shoulder bolts 75 are tightened using conventional tools to urge the cover assembly 10 into sealing engagement with the cylinder head 12, while the spaced apart standoffs 50 limit the degree of gasket crush and prevent over-tightening. For added strength, reinforcement ribbing 81 (FIG. 5) may be integrally formed with an interior of the cover 20.

As best shown in FIGS. 4 and 5, arcuate backcuts 82 may be formed with the interior of the cover 20 on opposite side walls 22, 23 to accommodate actuation of rocker arms 18 at the cylinder head 12. The opposite side and end walls 22-25 may also define interior, 60-degree horizontal backcuts 85 configured to promote oil drainback to the cylinder head 12.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under 35 U.S.C. § 112 (f) [or 6th paragraph/pre-AIA] is not intended. Additionally, it is not intended that the scope of patent protection afforded the present invention be defined by reading into any claim a limitation found herein that does not explicitly appear in the claim itself.

What is claimed:

1. An engine valve cover assembly adapted for mounting over a cylinder head of an internal combustion engine, comprising:

a cover having a top wall and integrally formed side and end walls defining an open bottom, said top wall including an exposed outside surface and an opposing inside surface; and a plurality of cover standoffs adapted for mounting to a floor of the cylinder head, and having respective distal ends configured to engage the inside surface of said top wall, wherein the distal end of each standoff and the inside surface of said top wall comprise complementary male and female formations configured to mate upon installation of said cover over the cylinder head, thereby consistently and precisely aligning a bottom perimeter edge of said cover with a perimeter edge of the cylinder head.

2. The engine valve cover assembly according to claim 1, wherein said formations located on the inside of said cover comprise a plurality of bosses.

3. The engine valve cover assembly according to claim 1, wherein said formation located at the distal end of each standoff comprises a counterbore.

4. The engine valve cover assembly according to claim 3, wherein the distal end of each standoff defines an internally-threaded fastener hole adjacent said counterbore.

5. The engine valve cover assembly according to claim 4, and comprising a plurality of threaded bolts inserted through respective fastener holes in said top wall of said cover, and configured to be received into the internally-threaded fastener holes of said standoffs.

6. The engine valve cover assembly according to claim 5, and comprising a plurality of O-rings located between said threaded bolts and said cover at respective fastener holes formed in said top.

7. The engine valve cover assembly according to claim 1, wherein each standoff comprises a threaded connector located at a proximal end opposite the distal end, and wherein said threaded connector is configured to be received into a complementary-threaded opening in the floor of the cylinder head.

8. The engine valve cover assembly according to claim 1, wherein said top wall of said cover defines at least one opening for receiving an Army-Navy fitting.

9. The engine valve cover assembly according to claim 1, wherein said top wall of said cover defines an oil fill opening.

10. The engine valve cover assembly according to claim 1, and comprising reinforcement ribbing integrally formed with an interior of said cover.

11. The engine valve cover assembly according to claim 10, wherein the interior of said cover includes a plurality of rocker arm backcuts configured to accommodate actuation of rocker arms at the cylinder head of the internal combustion engine.

12. The engine valve cover assembly according to claim 10, wherein the interior of said cover includes a horizontal backcut configured to promote oil drainback to the cylinder head.

13. The engine valve cover assembly according to claim 1, and comprising a cover gasket located at the bottom perimeter edge of said cover.

14. An engine valve cover assembly adapted for mounting over a cylinder head of an internal combustion engine, comprising:

a cover having a top wall and integrally formed side and end walls defining an open bottom, said top wall including an exposed outside surface and an opposing inside surface; and a plurality of standoffs having respective proximal and distal ends, and each standoff comprising a threaded connector located at the proximal end and configured to be received into a complementary-threaded opening in the floor of the cylinder head, and wherein the distal end of each standoff defines a counterbore configured to mate with a complementary boss formed on the inside surface of said top wall upon installation of said cover over the cylinder head, thereby consistently and precisely aligning a bottom perimeter edge of said cover with a perimeter edge of the cylinder head.

15. The engine valve cover assembly according to claim 14, wherein the distal end of each standoff defines an internally-threaded fastener hole adjacent said counterbore.

16. The engine valve cover assembly according to claim 15, and comprising a plurality of threaded bolts inserted through respective fastener holes in said top wall of said cover, and configured to be received into the internally-threaded fastener holes of said standoffs.

17. The engine valve cover assembly according to claim 14, and comprising reinforcement ribbing integrally formed with an interior of said cover.

18. The engine valve cover assembly according to claim 17, wherein the interior of said cover includes a plurality of rocker arm backcuts configured to accommodate actuation of rocker arms at the cylinder head of the internal combustion engine.

19. The engine valve cover assembly according to claim 17, wherein the interior of said cover includes a horizontal backcut configured to promote oil drainback to the cylinder head.

20. The engine valve cover assembly according to claim 14, and comprising a cover gasket located at the bottom perimeter edge of said cover.

* * * * *